(12) United States Patent
Kushner

(10) Patent No.: US 11,010,655 B1
(45) Date of Patent: May 18, 2021

(54) COMPUTER-BASED SYSTEMS FOR PROTECTING SHIPPING INFORMATION

(71) Applicant: Wells Fargo Bank, N.A., San Francisco, CA (US)

(72) Inventor: Kristine Ing Kushner, Orinda, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 198 days.

(21) Appl. No.: 16/151,069

(22) Filed: Oct. 3, 2018

(51) Int. Cl.
*G06K 19/10* (2006.01)
*G06Q 10/08* (2012.01)
*H04L 9/32* (2006.01)

(52) U.S. Cl.
CPC .......... *G06K 19/10* (2013.01); *G06Q 10/0832* (2013.01); *G06Q 10/0833* (2013.01); *H04L 9/3213* (2013.01); *G06Q 2220/145* (2013.01)

(58) Field of Classification Search
CPC .............. G06K 19/10; G06Q 10/0832; G06Q 10/0833; G06Q 2220/145; H04L 9/3213
USPC ........................................................ 713/159
See application file for complete search history.

(56) References Cited

U.S. PATENT DOCUMENTS

| | | | |
|---|---|---|---|
| 6,748,366 | B1 | 6/2004 | Hurwitz et al. |
| 7,295,997 | B2 | 11/2007 | Estes et al. |
| 8,598,482 | B2 | 12/2013 | Bonnell et al. |
| 8,805,747 | B2 | 8/2014 | Zimberoff et al. |
| 8,812,373 | B2 | 8/2014 | Johnson |
| 9,016,559 | B2 | 4/2015 | Gillen et al. |
| 9,886,656 | B2 | 2/2018 | Chen et al. |
| 2002/0032612 | A1* | 3/2002 | Williams ........... G06Q 30/0601 705/26.1 |
| 2005/0252596 | A1* | 11/2005 | Olsen ................ B07C 7/005 156/64 |

(Continued)

FOREIGN PATENT DOCUMENTS

CN 103810584 A 5/2014

OTHER PUBLICATIONS

Palumbo et al., "Postal address block location in real time", doi: 10.1109/2.144438, vol. 25, No. 7, pp. 34-42, Jul. 1992. (Year: 1992).*

(Continued)

*Primary Examiner* — Peter C Shaw
(74) *Attorney, Agent, or Firm* — Shumaker & Sieffert, P.A.

(57) ABSTRACT

This disclosure describes computer-based techniques for controlling access to shipping information for packages by providing limited shipping information to a courier to advance the package to a next node along a transit route. An administrator computer generates a set of components for a transit state of and information about the package. The set of components represents constituent "tokenized" portions of a delivery address, such as a sender or recipient name, street number, street name, city, or zip code. The transit states of the package represent various transit functions of the courier, such as pick-up, correct handling, sorting, delivery, return, and exception. The administrator computer generates sets of components that enable the courier to advance the package to a next node, but that exclude shipping information that may not be useful for advancing the package. The administrator computer sends the set of components to the courier based on the current transit state of the package.

19 Claims, 5 Drawing Sheets

(56) References Cited

U.S. PATENT DOCUMENTS

| | | | |
|---|---|---|---|
| 2006/0136237 A1* | 6/2006 | Spiegel | G06Q 10/083 705/330 |
| 2006/0178994 A1 | 8/2006 | Stolfo et al. | |
| 2006/0282277 A1* | 12/2006 | Ng | G06Q 10/0831 705/333 |
| 2007/0250326 A1* | 10/2007 | Kadaba | B07C 3/14 705/408 |
| 2008/0022117 A1 | 1/2008 | Kalker | |
| 2008/0169343 A1* | 7/2008 | Skaaksrud | G06Q 10/08 235/376 |
| 2016/0180132 A1* | 6/2016 | Lim | G06K 7/10544 235/462.45 |
| 2017/0220976 A1* | 8/2017 | Schmidt | G06Q 10/083 |
| 2018/0107907 A1 | 4/2018 | Chen et al. | |

OTHER PUBLICATIONS

NextPakk, "NextPakk Pakka Token: Blockchain Shipping Package Delivery Service?," accessed from https://bitcoinexchangeguide.com/nextpakk-pakka-token/ on or about May 29, 2018, 2 pp.

"Tracking Event Descriptions," United Parcel Service of America, accsessed from https://www.ups.com/us/en/tracking/tracking/description.page on or about Oct. 2, 2018, 3 pp.

"Appendix Q; Track Event Codes," accessed from https://www.fedex.com/us/developer/WebHelp/ws/2014/dvg/WS_DVG_WebHelp/Appendix_Q_Track_Service_Scan_Codes.htm published online 2014, and accessed on or about Oct. 2, 2018, 26 pp.

* cited by examiner

COMPUTER-BASED SYSTEMS FOR PROTECTING SHIPPING INFORMATION

TECHNICAL FIELD

The invention relates to computer-based systems configured to control shipping information for packages.

BACKGROUND

When a package is shipped via a carrier, shipping information regarding the sender and recipient of the package is included on the shipping label of the package. This shipping information may explicitly provide information as to the sender and recipient of the package, such as by associating a recipient's name with the recipient's address, as well as implicitly provide information as to the contents of the package, such as from the context of the sender's name. A person gaining access to the package may freely view this information from the shipping label. Either of the recipient or sender may wish for this information to remain private, such as for privacy reasons or package security reasons. While encoding this information, such as through a bar code, may limit the information a person intercepting the package may view, it may not limit the information decoded. For example, a person that is able to decode the information may still have access to all the information contained on the shipping label.

SUMMARY

In general, this disclosure describes computer-based techniques for protecting shipping information for a package. More specifically, the computer-based techniques include controlling access to shipping information for shipped packages by providing limited shipping information to a courier of the package to advance the package to a next node along a transit route to a destination. In order to protect the shipping information, the disclosed techniques enable a component generation unit running on an administrator computer to generate a set of components for a transit state of the package. The set of components may represent constituent "tokenized" portions of a delivery address, such as a sender or recipient name, street number, street name, city, zip code, province, county, province, country, or descriptive text. A supplementary piece of "tokenized" information may describe the item being delivered. There may be more than one piece of supplementary information—for example the class of the item may require different handling (valuable, hazardous, delicate, perishable (may include expiration date, or temperature requirements), etc.). Another piece of information may be very specific, and may be helpful in remediation of problems relating to mis-delivered items or other exceptions. The transit states of the package may represent various transit functions of the courier, such as pick-up, origin sorting, destination sorting, delivery, return, and exception. The component generation unit may generate sets of components that enable the courier to advance the package to a next node of the transit route, but that exclude shipping information that may not be necessary or useful for advancing the package. The disclosed techniques may further enable a component administration unit on the administrator computer to send the set of components to the courier based on the current transit state of the package. In this way, the techniques discussed herein may enable the administrator computer to control shipping information for a package so that address information may be accessed only when needed for a particular segment or state of the transit route.

In one example, this disclosure is directed to a method by one or more processors of a computing device, including receiving, by the computing device, a first request for destination information for a package. The first request includes a package identifier (ID) of the package. The method further includes determining, by the computing device, a first set of components of a delivery address of the package based on the package ID and a first transit state of the package. The first transit state is associated with a first node in a transit route of the package. The method further includes sending, by the computing device, the first set of components of the delivery address. The method further includes receiving, by the computing device, a second request for destination information for the package. The second request includes the package ID. The method further includes determining, by the computing device, a second set of components of the delivery address of the package based on the package ID and a second transit state of the package. The second transit state is associated with a second node in the transit route of the package. The second set of components is different from the first set of components. The method further includes sending, by the computing device, the second set of components of the delivery address.

In another example, this disclosure is directed to a computing device comprising a memory and one or more processors in communication with the memory. The one or more processors are configured to receive a first request for destination information for a package. The first request includes a package identifier (ID) of the package. The one or more processors are further configured to determine a first set of components of a delivery address of the package based on the package ID and a first transit state of the package. The first transit state is associated with a first node in a transit route of the package. The one or more processors are further configured to send the first set of components of the delivery address. The one or more processors are further configured to receive a second request for destination information for the package. The second request includes the package ID. The one or more processors are further configured to determine a second set of components of the delivery address of the package based on the package ID and a second transit state of the package. The second transit state is associated with a second node in the transit route of the package. The second set of components is different from the first set of components. The one or more processors are further configured to send the second set of components of the delivery address.

In a further example, this disclosure is directed to a non-transitory computer-readable storage medium having stored thereon instructions that, when executed, cause one or more processors to receive a first request for destination information for a package. The first request includes a package identifier (ID) of the package. The instructions further cause the one or more processors to determine a first set of components of a delivery address of the package based on the package ID and a first transit state of the package. The first transit state is associated with a first node in a transit route of the package. The instructions further cause the one or more processors to send the first set of components of the delivery address. The instructions further cause the one or more processors to receive a second request for destination information for the package. The second request includes the package ID. The instructions further cause the one or more processors to determine a second set of components of the delivery address of the package based on the package ID and a second transit state of the package. The second transit state is associated with a second node in the transit route of the package. The second set of components is different from the first set of components. The instructions further cause the one or more processors to send the second set of components of the delivery address.

The details of one or more examples of the invention are set forth in the accompanying drawings and the description below. Other features, objects, and advantages of the invention will be apparent from the description and drawings, and from the claims.

DETAILED DESCRIPTION

Figure 1:
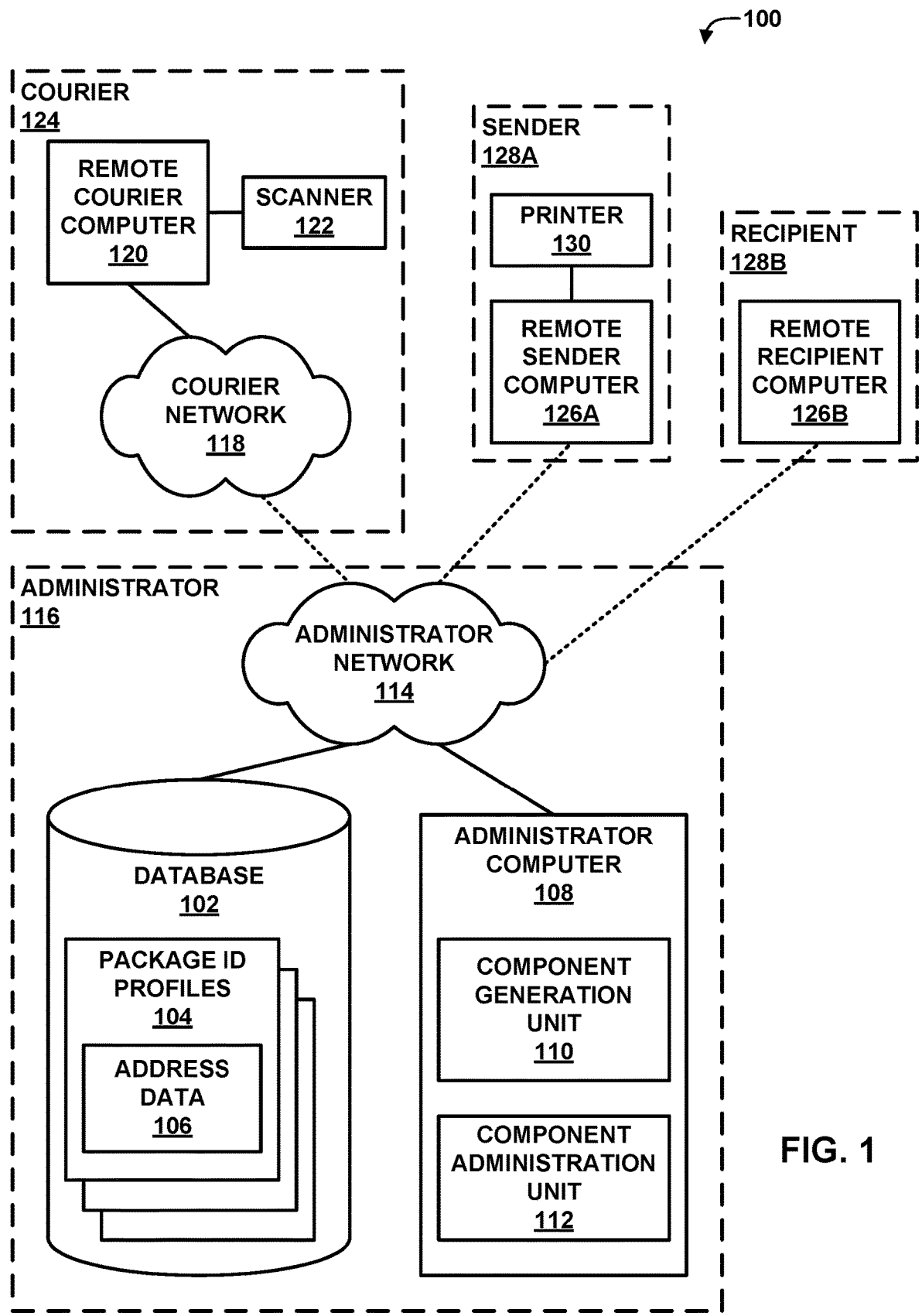
FIG. 1 is a block diagram illustrating an example system that includes an administrator computer configured to control access to shipping information for a package, in accordance with the techniques of this disclosure.

FIG. 1 is a block diagram illustrating an example system 100 for controlling access to shipping information for a package, in accordance with the techniques of this disclosure. In the example of FIG. 1, system 100 includes an administrator 116, a courier 124, a sender 128A, and a recipient 128B. However, in other examples, any of administrator 116, courier 124, sender 128A, and recipient 128B may be a same entity.

Courier 124 may be any entity that receives destination information for a package and handles delivery of the package based on the destination information. In some examples, a courier may be referred to as a carrier, shipping company, transport company, delivery company, or the like. A courier may handle package deliver within a local region, national region, or multi-national/international region. As used herein, the term courier may denote a single, stand-alone company or a relationship between multiple companies used to transport a packet between remote sources and destinations.

A package may include any object that is marked, tagged, or otherwise identified by a package identifier (ID) for shipping by a courier service. As an example of operation of courier 124, courier 124 may ship a package along a transit route, such as illustrated and explained in FIG. 5. This transit route may include various transit states associated with shipping functions. For example, throughout its transit route, a package may be received, picked up, sorted, carried, delivered, returned, and/or lost. Each of these actions may take place at a plurality of locations, or nodes, along the transit route. For example, the package may be received at a retail facility, sorted at a regional sorting facility near an origin of the package, sorted at a regional sorting facility near a destination of the package, and delivered at a delivery address. While the plurality of nodes may be part of a larger distributed network, a linear arrangement of the plurality of nodes may form the transit route. As such, destination information may represent any information that is used by courier 124 to advance the package to the next node in the linear arrangement. Courier 124 may include a variety of entities including, but not limited to, carrier, shipping company, transport company, delivery company, postal services, and any other service that carries a package for at least a portion of the transit route.

Sender 128A may be any entity that sends a package using courier 124, while recipient 128B may be any entity that receives a package using courier 124. Sender 128A and/or recipient 128B (collectively referred to as "users 128") may include, but are not limited to, merchants, agencies, customers, or any other entity that may send or receive a package using courier 124. In the example of FIG. 1, each of sender 128A and recipient 128B may include a remote sender computer 126A or remote recipient computer 126B, respectively, configured to send, process, and/or transmit data. For example, one or both of users 128 may send a delivery address of either sender 128A or recipient 128B to administrator 116. Sender 128A may include a printer 130 coupled to remote sender computer 126A and configured to print shipping label information from administrator 116 for coupling to the package.

Administrator 116 may be any entity that controls address data of sender 128A and/or recipient 128B for shipping and/or delivering a package. For example, sender 128A or recipient 128B may entrust administrator 116 with a delivery address of either or both of sender 128A and/or recipient 128B. While users 128 may be comfortable with administrator 116 having access to this address data, at least one of users 128 may wish to restrict access to this address data for other entities. For example, recipient 128B may be a customer that wishes for sender 128A, an auction seller, to have no access to this address data and for courier 124, a delivery service, to have limited access to this address data, such as on a need-to-know basis. In these instances, administrator 116 may control access to the address data for courier 124 and, optionally, users 128. Administrator 116 may include a variety of entities including, but not limited to, financial institutions, merchants, couriers, or the like.

Courier 124 includes remote courier computer 120 in communication with scanner 122 and courier network 118. Although FIG. 1 only illustrates one scanner 122 and one remote courier computer 120, in other examples, system 100 may include more than one of any of scanner 122 and remote courier computer 120. Courier network 118 may comprise a private network including, for example, a private network associated with an organization, or may comprise a public network, such as the Internet.

Scanner 122 may include any device configured to scan a package identifier (ID) on a package and transmit information from the package ID to remote courier computer 120. For example, the package may include a label, tag, RFID, manually written or drawn information, or other identifier that is configured to convey a package ID associated with the package. Scanner 122 may include, but is not limited to, bar code scanners, cameras, or any other device capable of receiving information from a shipping label, tag, or other identifier. In some examples, scanners 122 may be supplemented or augmented by manual input of information to the information capturing system, such as by a person with access to the information.

Remote courier computer 120 is configured to receive, process, and/or transmit data, such as shipping or package (i.e. label or tag) data to and from scanner 122 and courier network 118. Remote courier computer 120 may be configured to generate, in response to receiving the package ID of the package, a request for destination information for the package and send the request for destination information to administrator computer 108 of administrator 116. The request may include the package identifier (ID) of the package obtained from scanner 122. Remote courier computer 120 may be configured to receive, in response to sending the request and from administrator computer 108, destination information for the package.

In some examples, the request for destination information may include location information of scanner 122. For example, a location of scanner 122 may indicate a location at which the package was scanned, and thus the location of the package, such as a particular node of the plurality of nodes at which the package is located. Location information may include any indicator of a location of scanner 122 including, but not limited to, GPS data, network data, identification data, and the like.

In some examples, the request for destination information includes a scanner identifier (ID) of scanner 122. The scanner ID may be an identifier associated with location or verification information of scanner 122, such that the scanner ID for scanner 122 may be used as location information or verification information for responding to the request for destination information. For example, the scanner ID may be associated with a location, such as a particular node, such that the scanner ID may be mapped to the location of scanner 122 as location information. As another example, the scanner ID may be associated with scanner 122 and/or remote courier computer 120, such that the scanner ID may provide verification of the request.

Administrator 116 includes administrator computer 108 and database 102 in communication with each other via administrator network 114. Database 102 may include package identifier (ID) profiles 104 containing address data 106 for each package ID. Administrator computer 108 is configured to control access to address data 106 for a package. Administrator computer 108 may include component generation unit 110 and component administration unit 112. Although FIG. 1 only illustrates one database 102 and one administrator computer 108, in other examples, system 100 may include more than one of any of database 102 and administrator computer 108.

Administrator network 114 may comprise a private network including, for example, a private network associated with an organization, or may comprise a public network, such as the Internet. Although illustrated in FIG. 1 as a single entity, in other examples administrator network 114 may comprise a combination of public and/or private networks. In some examples, remote sender computer 126A of sender 128A may be coupled to administrator network 114, such that sender 128A may user printer 130 to print shipping label information directly from administrator 116. For example, in examples where administrator 116 is a financial institution, remote sender computer 126A may be an automated teller machine (ATM) or other remote and secured computer terminal configured with printer 130 to print shipping labels.

Database 102 may be a data structure for storing data related to the system 100 including package ID profiles 104. Although illustrated in FIG. 1 as being included within administrator 116, database 102 may be stored by any suitable party and in any suitable location according to particular needs. For example, database 102 may be stored and maintained by an organization associated with system 100 or by a third-party vendor that stores and maintains data. Although illustrated as a single database 102, any suitable number of databases may be used for storing the data described according to particular needs. Although shown as being separate from administrator computer 108, in certain examples, database 102 may be stored and executed within administrator computer 108.

Each of package ID profiles 104 stored in database 102 may be associated with a package ID of a package. As discussed above, the package ID acts as an identifier of the package, such that data associated with the package may be mapped to one of package ID profiles 104 associated with the package ID. Each of package ID profiles 104 may contain address data 106 for the package associated with the corresponding package ID.

Address data 106 may include any shipping information for a package. Shipping information may include a source address, a delivery address, or one or more intermediate addresses along the transit route between the source address and the delivery address. In some examples, address data 106 includes address data sent to administrator computer 108 by users 128. For example, address data 106 may include a delivery and/or return address of any of users 128. In some examples, address data 106 includes address data for any of the plurality of nodes. For example, address data 106 may include a delivery address of one or more nodes along the transit route.

Address data 106 may be constituted by various components. These components may direct an entity delivering the package on where to deliver the package, who to deliver the package to, and/or how to notify recipient 128B and/or sender 128A of the package, such as regarding pick-up, delivery, or occurrence of an exception. For example, components of the address may include information having a different level of localization in a hierarchy (e.g., a city vs. a street within the city) or information having a different function for delivery of the package (e.g., a house number vs. a recipient name). Components of address data 106 may include, but are not limited to, a zip code, a state/province, a county, a city, a street address, a house number, an apartment number, a first name, a last name, a phone number, an email address, twitter handle, or other electronic communications identifier, or any other identifier. For example, contact information may be used to notify senders or recipients that the delivery is complete, to request instructions (such as handling clarifications "e.g. what is the temperature variance tolerance?", or remediation instructions if the delivery is mis-handled—e.g. out-of-spec temperature, or lost), or to perform other notification or inquiry functions.

Administrator computer 108 may be associated with administrator 116. As illustrated in FIG. 1, in some examples, administrator computer 108 may be a centralized computing device configured to execute component generation unit 110 and/or component administration unit 112 for controlling access to shipping information for a package. Administrator computer 108 may comprise a cluster of one or more computers, workstations, servers, and the like. Administrator computer 108 configured to execute component generation unit 110 and/or component administration unit 112 may be physically or virtually included within an internal network of an organization. Alternatively, administrator computer 108 configured to execute component generation unit 110 and/or component administration unit 112 may be physically or virtually included in a network hosted by a third-party vendor. For example, a vendor of an organization may store and maintain component generation unit 110 and/or component administration unit 112 for an organization and/or may provide the functions of component generation unit 110 and/or component administration unit 112 as a service to the intermediary institution. In some examples, administrator computer 108 may be a computing device further from a centralized node of a network.

Component generation unit 110 may be configured to receive a delivery address for a package. In some examples, component generation unit 110 may receive the delivery address as part of a shipping request for a package. For example, component generation unit 110 may receive a delivery address from sender 128A and/or recipient 128B as part of a shipping request from sender 128A to recipient 128B. In some examples, component generation unit 110 may receive the delivery address from within administrator 116, such as from a database. For example, component generation unit 110 may receive the delivery address as part of an account set-up for recipient 128B, store the delivery address associated with recipient 128B, and recall the delivery address associated with recipient 128B upon a shipping request from sender 128A.

Component generation unit 110 may be configured to generate a plurality of sets of components of the delivery address from components of the delivery address. Each set of components of the plurality of sets of components may be associated with a transit state of a plurality of transit states for the transit route. As discussed above, the delivery address may be tokenized into a plurality of components. For a particular transit state, not all the components of the delivery address may be useful for advancing the package to a next node in the transit route. For example, a zip code may be useful for sorting the package at the origin, but a street address may not be useful. Further, different components may be useful for different transit states. For example, a street name and a zip code may be useful for selecting a delivery truck on which to place the package, while a residence unit number and first name may be useful to drop off a package. Rather than provide the entire address, which may include extraneous information that a sender 128A and/or recipient 128B does not wish to be accessed at all times, component generation unit 110 may select only those components that may be useful for advancing the package to the next node of the transit route. The set of components of the delivery address may include one or more of a zip code, a state, a city, a street address, a house number, an apartment number, a first name, a last name, a phone number, or an email address, twitter handle, or other electronic communications identifier.

Component generation unit 110 may be configured to store the plurality of sets of components of the delivery address in database 102. For example, component generation unit 110 may store the components of the delivery address associated with recipient 128B to address data 106 in a package ID profile 104 associated with a package ID of the package. Address data 106 may map the set of components to a transit state of the package, such that each transit state may be associated with a particular set of components.

Component administration unit 112 may control access to address data 106 associated with a package once the package is in transit. Component administration unit 112 may be configured to receive a request for destination information for a package. As explained above, the request for destination information includes a package ID of the package. For example, at one or more nodes of the transit route, courier 124, such as a sorter, driver, or other employee of courier 124, may send the request for destination information for the package, such as from remote courier computer 120, to administrator computer 108.

Component administration unit 112 may be configured to determine a set of components of the delivery address of the package based on the package ID and the transit state of the package. For a particular package associated with a package ID, component administration unit 112 may determine a different set of components based on the particular transit state of the package, such as by using the package ID and transit state to look up the set of components in address data 106 in database 102. For example, component administration unit 112 may be configured to determine a first set of components based on a first transit state and a second set of components based on a second transit state.

Component administration unit 112 may be configured to send the set of components of the delivery address to courier 124, such as to remote courier computer 120 through courier network 118. For example, remote courier computer 120 may receive the set of components and display the set of components on a display device. An operator of the display device, such as a sorter or driver, may handle the package based on the displayed set of components.

The systems discussed herein, such as system 100 of FIG. 1, may protect access to shipping information for a package. For example, a user that does not use an administrator to control access to shipping information may have personal information exposed to a large number of people and/or recording devices. In contrast, the systems described herein may protect access to shipping information by selecting components of a delivery address to send to a courier. For example, computer-based systems described herein may send a courier only enough information for advancing the package to a next node along the transit route, while restricting access to extraneous information. In this way, access to shipping information may be restricted for employees having particular job functions at particular locations along the transit route.

Figure 2:
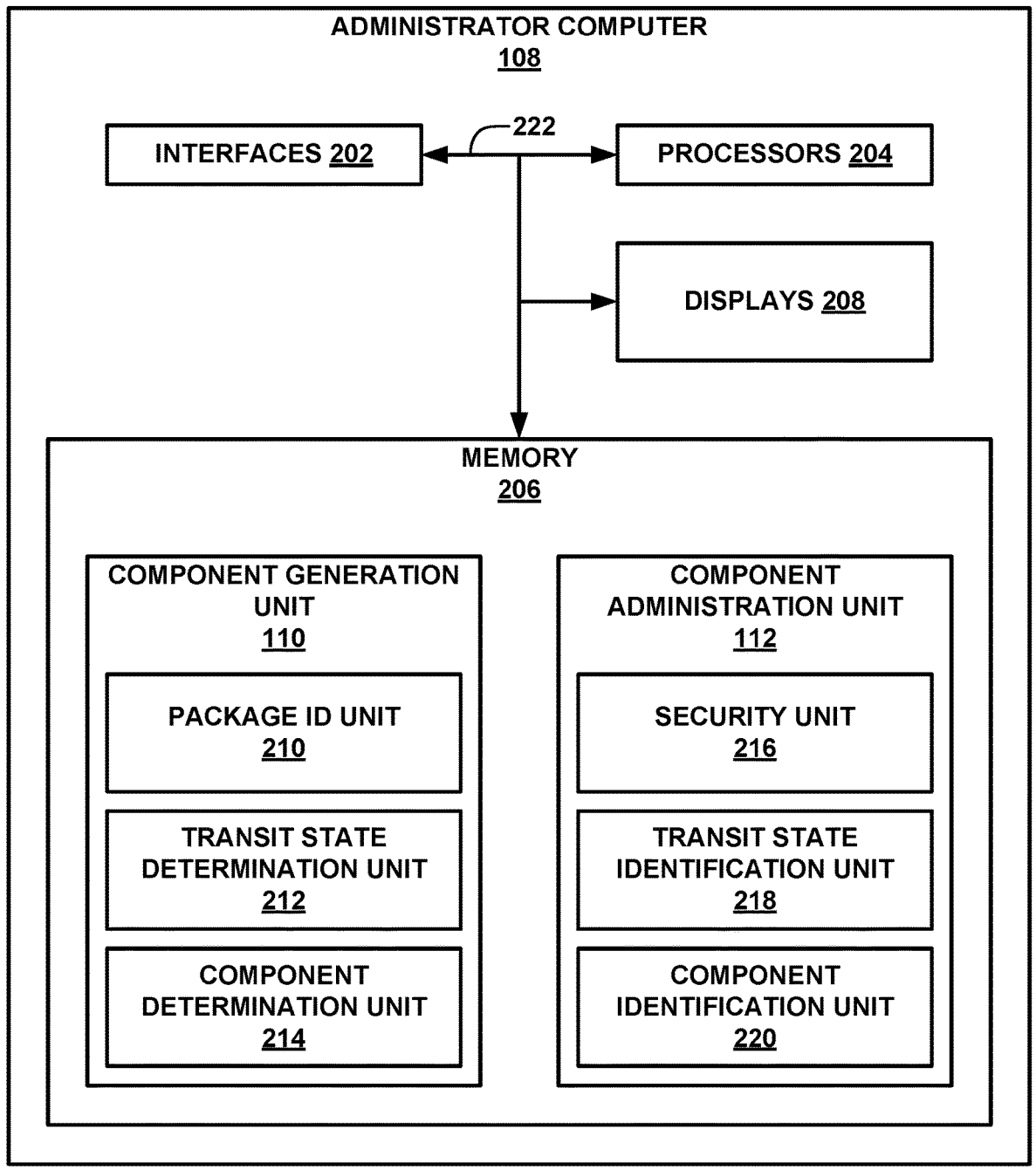
FIG. 2 is a block diagram illustrating an example administrator computer of FIG. 1 in further detail.

FIG. 2 is a block diagram illustrating an example administrator computer of FIG. 1 in further detail. Administrator computer 108 may include interfaces 202, processors 204, memory 206, displays 208, and a communication bus 222.

Administrator computer 108 may include one or more interfaces 202 for allowing component generation unit 110 and component administration unit 112 to communicate with one or more databases (e.g., database 102), servers, devices and/or networks via one or more networks, e.g. administrator network 114. The one or more interfaces 202 may include one or more network interface cards, such as Ethernet cards, and/or any other types of interface devices that can send and receive information. In some examples, component generation unit 110 and component administration unit 112 utilize the one or more interfaces 202 to communicate with database 102 and/or any other suitable device. Any suitable number of interfaces may be used to perform the described functions according to particular needs.

Administrator computer 108 may include one or more processors 204 configured to implement functionality and/or process instructions for execution within component generation unit 110 and component administration unit 112. Processors 204 may include, for example, microprocessors, digital signal processors (DSPs), application specific integrated circuits (ASICs), field-programmable gate arrays (FPGAs), and/or equivalent discrete or integrated logic circuitry.

Administrator computer 108 may include memory 206 configured to store information within administrator computer 108. Memory 206 may include a computer-readable storage medium or computer-readable storage device. In some examples, memory 206 may include one or more of a short-term memory or a long-term memory. Memory 206 may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, memory 206 may store logic (e.g., logic of component generation unit 110 and component administration unit 112) for execution by one or more processors 204. In further examples, memory 206 may be used by component generation unit 110 and component administration unit 112 to temporarily store information during program execution.

Administrator computer 108 may include one or more displays 208 for displaying a graphical user interface (GUI) that may allow a user, e.g., a system administrator, to interact with administrator computer 108 by display of graphical icons and visual indicators. In certain examples, any of the displays 208 may be a touch sensitive screen and may present one or more touch sensitive GUI elements. For example, a user may be able to interact with display 208 to respond to options displayed on display 208 and initiate an action by touching one or more of the touch sensitive GUI elements displayed on display 208. For example, display 208 may be a presence-sensitive display that displays a GUI and receives input from a user using capacitive, inductive, and/or optical detection at or near the presence sensitive display. Alternatively or in addition, a user may be able to interact with an input device to respond to options displayed on display 208 and initiate an action by using any suitable input device such as, for example, a keyboard, touchpad, and/or any other suitable input device. Display 208 may comprise a cathode ray tube (CRT) monitor, a liquid crystal display (LCD), organic light emitting diode (OLED), or any other type of display device that can generate intelligible output to a user.

In operation, component generation unit 110 and component administration unit 112 may be used to control access to shipping information for a package. In the example of FIG. 2, component generation unit 110 includes package ID unit 210, transit state determination unit 212, and component determination unit 214, while component administration unit 112 includes security unit 216, transit state identification unit 218, and component identification unit 220. In other examples, however, component generation unit 110 and/or component administration unit 112 may include greater or fewer units than described in FIG. 2.

In general, component generation unit 110 may be configured to process address data and/or package data provided by users 128 and store the processed data in database 102 of FIG. 1, such that the package data may be linked to address data. Package data may include any data associated with the package and stored in package ID profiles 104 such as the package ID of the package, various transit states of the package, contents of the package, and handling instructions of the package. Address data, such as address data 106, may include components of address data 106 that are associated with the package ID and the various transit states. In this way, component generation system 110 may set-up database 102 so that address data 106 may be recalled from package data at a future time.

Package ID unit 210 may be configured to receive a request for a package ID for a package, such as from sender 128A. Package ID unit 210 may be configured to assign, in response to receiving the request for the package ID, a package ID to the package. Package ID unit 210 may store this package ID in a package ID profile 104 in database 102, such that the package ID may be used to associate address data 106 with the package.

As an extended example, recipient 128B may be a customer that places an order with sender 128A, a merchant. In response to receiving the order from recipient 128B, sender 128A may send a request for a package ID to administrator 116 so that sender 128A can ship a package to recipient 128B using courier 124. Package ID unit 210 may assign a package ID to the package and set up a package ID profile 104 in database 102 that associates the package ID with sender 128A and recipient 128B.

Package ID unit 210 may be configured to determine a delivery address for sender 128A and recipient 128B. In some examples, the request for the package ID may include a delivery address of either or both of sender 128A and recipient 128B, such that package ID unit 210 may determine the delivery address from the request for the package ID. Continuing with the extended example above, package ID unit 210 may receive a delivery address for recipient 128B from sender 128A, which sender 128A obtained from recipient 128B. In some examples, a delivery address of either of sender 128A or recipient 128B may be stored with administrator 116, such that package ID unit 210 may retrieve, in response to receiving the request for the package ID, the delivery address for sender 128A or recipient 128B. Continuing with the extended example above, sender 128A may have previously provided administrator 116 with a delivery address of sender 128A, such that package ID unit 210 may look up the delivery address for sender 128A to determine the delivery address (e.g., a return address or pick-up address of the package from sender 128A).

Package ID unit 210 may be configured to send the package ID to sender 128A. For example, package ID unit 210 may send the package ID to sender 128A so that sender 128A may affix a shipping label containing the package ID to the package. In some examples, package ID unit 210 may be configured to generate a shipping label that includes the package ID. For example, package ID unit 210 may generate a code that encrypts the package ID and can be scanned by scanner 122 of FIG. 1 and decoded by remote courier computer 120. The shipping label may have a combination of encrypted (i.e., the package ID) and unencrypted information. As an example, the shipping label may include an encrypted package ID of the package, an unencrypted zip code of sender 128A, and an unencrypted zip code of recipient 128B. During sorting, a sorting machine configured to sort packages based on a zip code may sort the package based on the zip code of recipient 128B without having to look up the package ID, which may take up bandwidth for high throughput sorting machines. In this example, once the package is within the delivery zip code, the package ID must be used to obtain further destination information. In some instances, a new label or portion of a label may be temporary, such that the label may be removed and replaced downstream with another label that obscures information that is not needed downstream, such as for a later node of the transit route. Alternately, the old label can be obscured by a new label, where the new label would show evidence of any tampering.

Transit state determination unit 212 may be configured to determine a plurality of transit states for a transit route of the package. In some examples, the plurality of transit states may be standardized, such as according to an industry or company standard, such that transit state determination unit 212 may retrieve the one or more transit states based on the standard. For example, the request for the package ID may include an identity of courier 124. Courier 124 may have established transit states associated with a particular type of package shipment, such as a ground shipment. In response to receiving the identity of courier 124, transit state determination unit 212 may determine the one or more transit states based on the established transit states of courier 124. Continuing with the extended example above, courier 124 may have established transit states for pick-up, origin sorting, centralized sorting, destination sorting, delivery truck loading, delivery truck transit, and delivery. Transit state determination unit 212 may retrieve the established transit states based on the identity of courier 124 and store the established transit states, such as to the package ID profile 104 associated with the package.

In some examples, transit state determination unit 212 may be configured to receive or generate a projected or anticipated transit route. For example, based on an address of sender 128A and an address of recipient 128B, transit state determination unit 212 may generate a plurality of anticipated nodes that will be passed through and determine transit states for the plurality of anticipated nodes. In some examples, transit state determination unit 212 may receive at least a portion of the transit route, such as from courier 124. For example, transit state determination unit may send limited delivery address information, such as zip codes, to courier 124 and, in response, receive an anticipated transit route between origin and destination sorting facilities. Additional transit states can be created to cover compliance with handling instructions such as "temperature measured and in compliance" or "handoff from [x] to [y]; chain of custody intact."

Component determination unit 214 may receive the delivery address of a sender 128A and/or recipient 128B and determine a plurality of components of the delivery address. A variety of techniques may be used to determine the plurality of components of the delivery address including, but not limited to, text recognition, address recognition, and the like. In some examples, component determination unit 214 may be configured to identify the plurality of components of the delivery address based on a format of the delivery address. Continuing with the extended example above, sender 128A may have provided administrator 116 with the delivery address of sender 128A and recipient 128B in a form that included separate entries for each component of the delivery address, such that the plurality of components may be extracted from the form.

Component determination unit 214 may be configured to generate a plurality of sets of components of the delivery address from the plurality of components of the delivery address. Each set of components of the plurality of sets of components is associated with a transit state of a plurality of transit states for the transit route. For each transit state, component determination unit 214 may generate a set of components that may advance the package to a next node of the transit route. An example Table 1 with associated components and a delivery function of the set of components is shown below.

TABLE 1

| Transit State | Set of Components | Goal |
| --- | --- | --- |
| Order Receipt | Sender street number<br>Sender street<br>Sender zip code<br>Handling instructions | Pick-up package |

TABLE 1-continued

| Transit State | Set of Components | Goal |
| --- | --- | --- |
| | code | |
| Pick-Up/Origin Sorting | Recipient zip code<br>Handling instructions code | Determine whether local (destination) or remote (origin) |
| Transit/Intermediate Sorting | Recipient zip code | Deliver to next facility |
| Destination Sorting | Recipient street<br>Recipient zip code<br>Handling instructions code | Load delivery truck |
| Delivery Transit | Recipient street number<br>Recipient street<br>Handling instructions code | Deliver to address |
| Delivery | Recipient name<br>Recipient unit number<br>Handling instructions code | Deliver to recipient |
| Exception/Return | Contents Code<br>Sender street number<br>Sender street<br>Sender zip code<br>Handling instructions code | Return to sender |

Component determination unit 214 may be configured to store the plurality of sets of components as address data 106 in package ID profiles 104 and map each of the plurality of sets of components with the corresponding transit state of the package ID.

In general, once component generation unit 110 has set up database 102 with address data 106 for the package ID of the package, component administration unit 112 may control access to address data 106 of the package by courier 124. Component administration unit 112 may be configured to receive package data, such as the package ID and/or the transit state of the package and provide courier 124 with destination information based on the package data. At this point, courier 124 may be responsible for handling the package based on address data. Continuing with the extended example above, sender 128A may send a request for courier 124 to take custody of the package. Throughout custody, courier 124 may scan the package ID of the package and request destination information from administrator 116 to advance the package through the transit route for eventual delivery to recipient 128B.

In some examples, security unit 216 may be configured to receive a request for destination information and verify that the request for destination information was received from an appropriate entity of courier 124. For example, the request for destination information may include a scanner ID of scanner 122 of FIG. 1. The scanner ID may be associated with courier 124 and act as a verification code for courier 124 and/or a particular entity of courier 124. Security unit 216 may verify the request for destination information based on the scanner ID. Continuing with the extended example above, a delivery driver of courier 124 may scan the package ID with scanner 122, transmit the package ID to remote courier computer 120, and send a request for destination information to security unit 216. The request for destination information may include the scanner ID of scanner 122 that verifies scanner 122.

Transit state identification unit 218 may be configured to determine a transit state of the package. The transit state is associated with a node in the transit route of the package. The transit state comprises at least one of pick-up, origin sorting, transit, destination sorting, delivery, or exception, as shown in the example of Table 1 above.

In some examples, the request for destination information includes the transit state of the package, such that transit state identification unit 218 may determine the transit state of the package from the content of the request for destination information. For example, courier 124 may have established transit states, such that courier 124 may provide a corresponding transit state of one of the established transit states as part of the request for destination information. Continuing with the extended example above, the request for destination information sent by remote courier computer 120 may include transit state information that identifies the request as coming from the delivery driver having an associated transit state of "delivery."

In some examples, the request for destination information may not explicitly include the transit state of the package, such that transit state identification unit 218 may determine the transit state of the package from context of the request for destination information and the package ID. In some examples, transit state identification unit 218 may determine the transit state of the package based on the package ID and location information of the package. The request for destination information may include location information for scanner 122, such as an IP address of remote courier computer 120 or other marker associated with a location of scanner 122. Based on a projected or anticipated transit route, transit state identification unit 218 may determine that the particular location of remote courier computer 120, and thus the package, is associated with a particular transit state of the package. Continuing with the extended example above, the request for destination information sent by remote courier computer 120 may include GPS location information that identifies the request as coming from a location associated with a destination scan. Based on the GPS location information, transit state identification unit 218 may determine that the package has an associated transit state of "destination sorting."

In some examples, the request for destination information may include a scanner ID of scanner 122. In some examples, component administration unit 112 may determine the transit state of the package based on the scanner ID. For example, scanner 122 may be associated with a particular transit state, such that transit state identification unit 218 may look up the scanner ID for scanner 122 and determine the transit state for the package based on the transit state associated with the scanner ID. In some examples, component administration unit 112 may be configured to determine the location of the package based on the scanner ID and determine the transit state of the package based on the location of the package. For example, scanner 122 may be associated with a particular location, such that transit state identification unit 218 may look up the location of the scanner ID for scanner 122 and determine the transit state for the package. Continuing with the extended example above, the request for destination information sent by remote courier computer 120 may include the scanner ID of scanner 122 that is assigned to a delivery route associated with the delivery address. Based on the scanner ID, transit state identification unit 218 may determine that the package has an associated transit state of "delivery."

In some examples, the package itself may transmit the transit state of the package. For example, the package or packaging may have a battery-powered transmitter, such that the package may be configured to transmit a transit state to administrator computer 108. The transmitter may transmit continuously or start transmitting if the package is out of compliance, such as during an "exception" transit state. If a package or carrier of the package is large enough (e.g. an ocean going shipping container), the package may be visually tracked from the air.

Component identification unit 220 may be configured to identify the set of components based on the transit state and the package ID. For example, component identification unit 220 may access the address data 106 of the package ID profile 104 associated with the package ID of the package and retrieve the set of components associated with the transit state. Continuing with the extended example above, component identification unit 220 may use the package ID and the transit state to look up, in address data 106, the set of components associated with the package ID of the package and the "delivery" transit state of the package. This set of components may include a house number and street of recipient 128B. Component identification unit 220 may be configured to send the set of components to remote courier computer 120.

Figure 3:
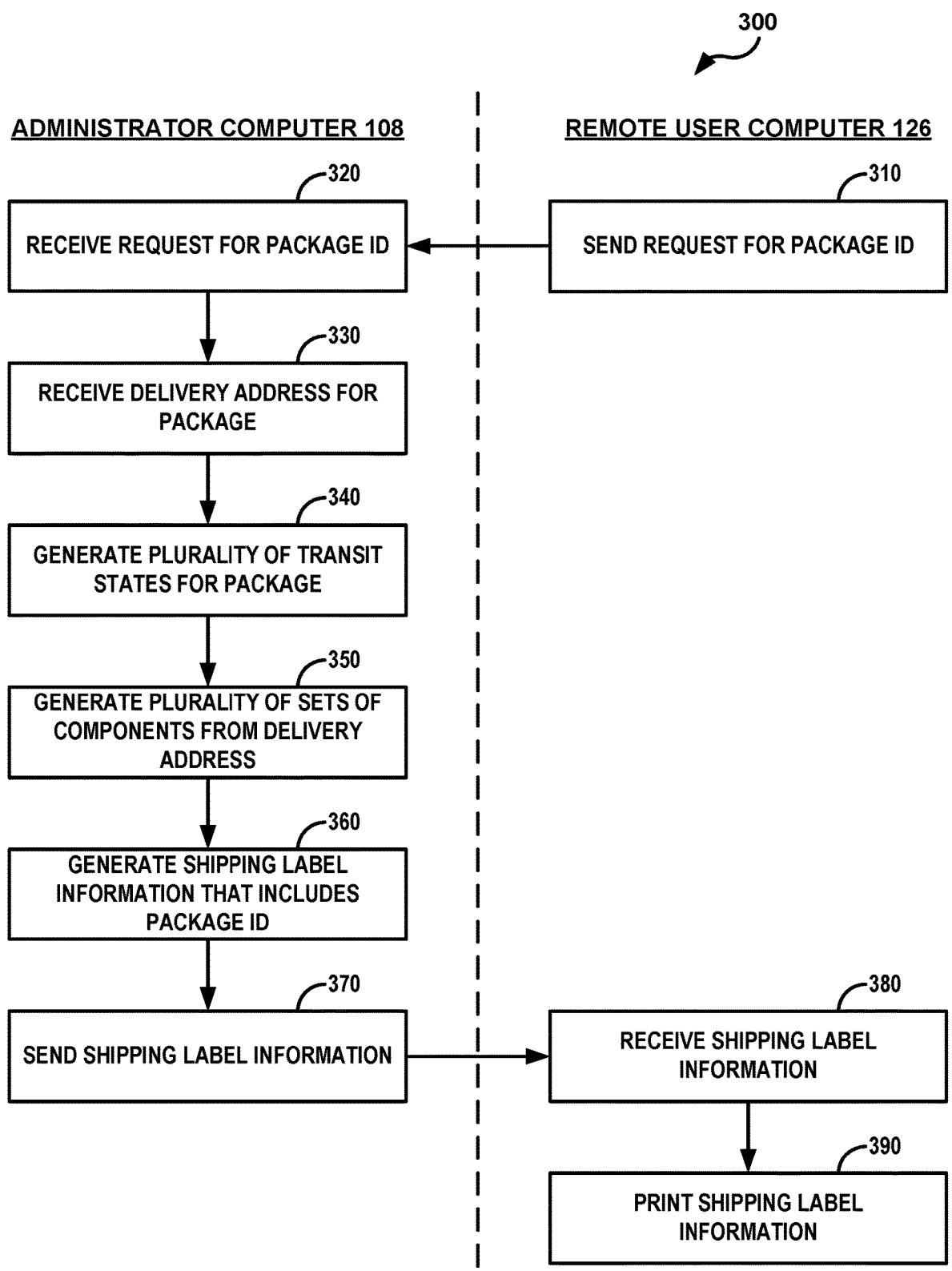
FIG. 3 is a flowchart illustrating an example operation of an administrator computer and a remote user computer of FIG. 1, in accordance with the techniques of this disclosure.

FIG. 3 is a flowchart illustrating an example operation of an administrator computer and a remote user computer of FIG. 1, in accordance with the techniques of this disclosure. Remote user computer 126 may send a request for a package ID for the package to administrator computer 108 (310). Administrator computer 108 may receive the request for the package ID for the package from remote user computer 126 (320). Administrator computer 108 may receive a delivery address of recipient 128B and/or sender 128A (330). In some examples, the request for the package ID may include the delivery address of recipient 128B and/or sender 128A, while in other examples, administrator 116 may retrieve the delivery address of recipient 128B and/or sender 128A, such as from a database.

Administrator computer 108 may generate a plurality of transit states for the package (340). In some examples, administrator computer 108 may determine the plurality of transit states based on established transit states for courier 124, while in other examples, administrator computer 108 may determine the plurality of transit states based on an anticipated transit route of the package. The transit route includes a plurality of nodes in a linear arrangement. Each node is associated with a transit state of the plurality of transit states.

Administrator computer 108 may generate a plurality of sets of components of the delivery address from components of the delivery address (350). Administrator computer 108 may associate each set of components of the plurality of sets of components with a transit state of the plurality of transit states for the transit route. The set of components represents information for advancing the package to the next node in the linear arrangement of the transit route.

Administrator computer 108 may generate shipping label information that includes the package ID for the package (360) and sending, by administrator computer 108, the shipping label information to remote user computer 126 (370). Remote user computer 126 may receive the shipping label information from administrator computer 108 (380). Remote user computer 126 may print, using printer 130, the shipping label information and attach the shipping label information to the package (390). Once the shipping label information is attached to the package, the package may be ready for pick up by courier 124.

Figure 4:
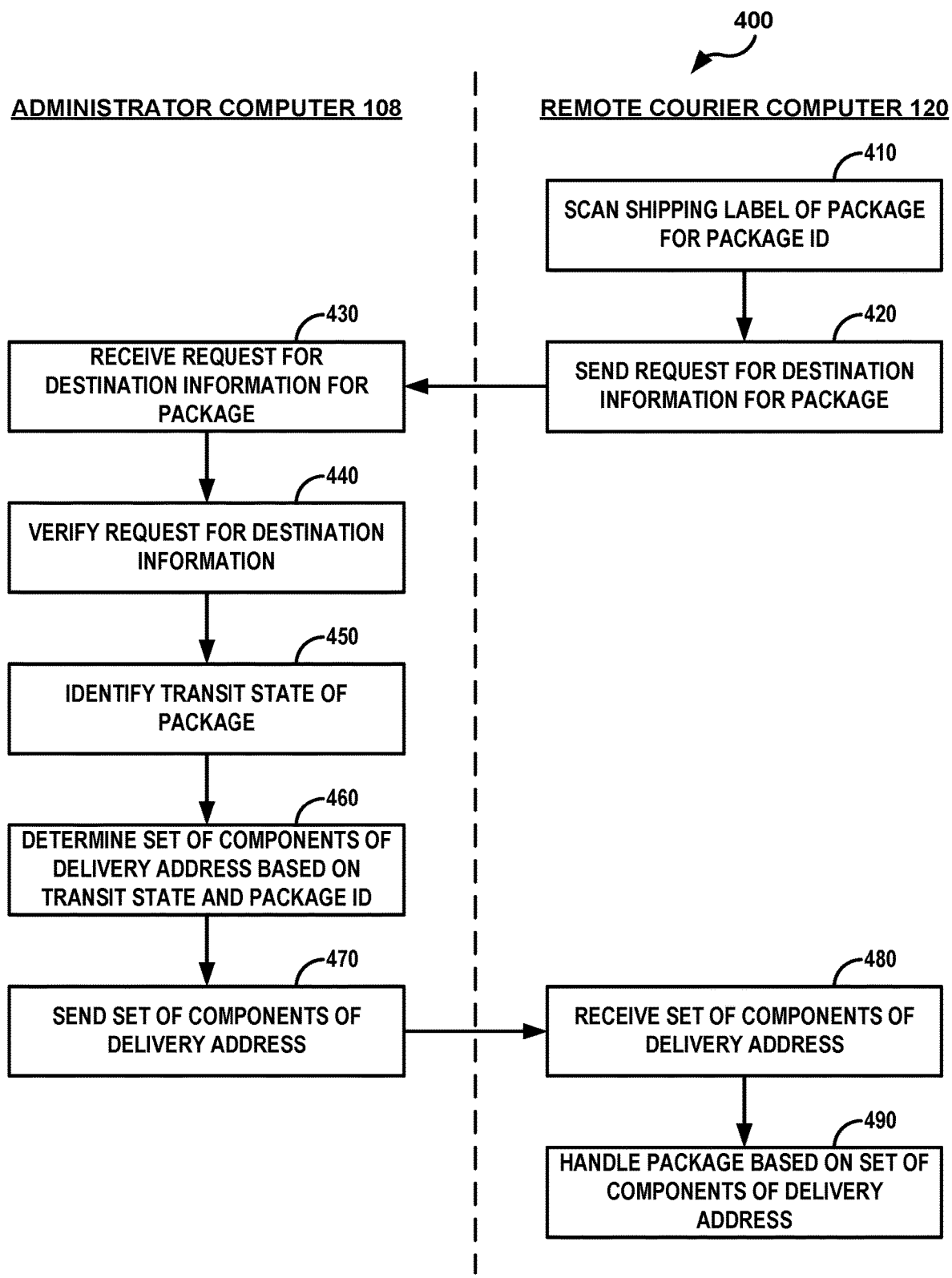
FIG. 4 is a flowchart illustrating an example operation of an administrator computer and a remote courier computer of FIG. 1, in accordance with the techniques of this disclosure.

FIG. 4 is a flowchart illustrating an example operation of an administrator computer and a remote courier computer of FIG. 1, in accordance with the techniques of this disclosure. Scanner 122 may scan shipping label information of the package and remote courier computer 120 may determine a package identifier (ID) of the package based on the scanned shipping label information (410). Remote courier computer 120 may send administrator 116 a request for destination information for the package (420).

Administrator computer 108 may receive the request for destination information for the package (430). The request includes the package ID of the package. Administrator computer 108 may verify the request for destination information (440). In some examples, administrator computer 108 may use a scanner ID of scanner 122 to verify the request for destination information.

Administrator computer 108 may identify the transit state of the package (450). In some examples, the request for destination information for the package may indicate the transit state of the package, such that administrator computer 108 may identify the transit state of the package based on the indicated transit state of the package. In some examples, administrator computer 108 may identify the transit state of the package based on location information of scanner 122. In some examples, administrator computer 108 may identify the transit state of the package based on a scanner ID of scanner 122 and location information associated with the scanner ID.

Administrator computer 108 may determine a set of components of a delivery address of the package based on the package ID and the transit state of the package (460). The transit state is associated with a node in a transit route of the package. Administrator computer 108 may send the set of components of the delivery address to remote courier computer 120 (470).

Remote courier computer 120 may receive the set of components of the delivery address (480). Courier 124 may handle the package based on the set of components of the delivery address (490). In this way, administrator 116 may provide courier 124 with sufficient destination information to advance the package to a next node in the transit route and, eventually, deliver the package to recipient 128B.

While FIG. 4 has been described with respect to remote courier computer 120, in some examples, remote sender computer 126A and/or remote recipient computer 126B may be configured to perform a portion of the techniques of FIG. 4. For example, a recipient may have a package delivered to common delivery area and wish to identify the corresponding package. At a "delivery" transit state, remote recipient computer 126B may be a smartphone with a camera, such that remote recipient computer 126B may scan the shipping information label from the package. Remote recipient computer 126B may send a request for destination information as the recipient and, upon verification, receive a name for the package.

Figure 5:
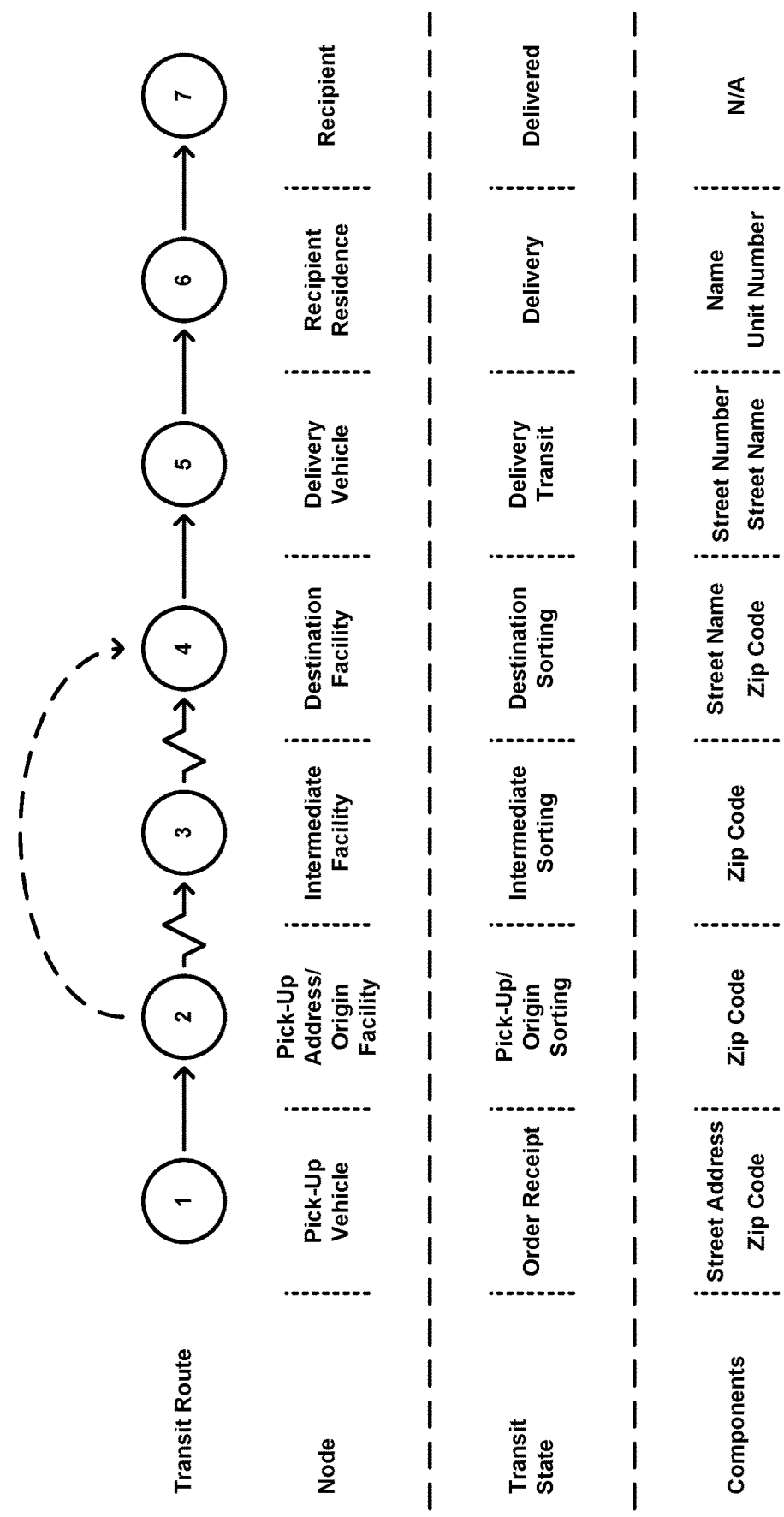
FIG. 5 is a schematic diagram illustrating an example transit route of a package, in accordance with techniques of this disclosure.

FIG. 5 is a schematic diagram illustrating an example transit route of a package, in accordance with techniques of this disclosure. The transit route may include a plurality of nodes, each node representing a point in the transit route at which destination information may be requested. Each node may be associated with a transit state of the transit route, and each transit state may be associated with a set of components of the delivery address of sender 128A and/or recipient 128B.

At a first node in the transit route, "Pick-Up Vehicle," courier 124 may receive a shipping request from sender 128A and initiate the shipment by travelling to pick up the package. The first node may be associated with a first transit state, "Order Receipt." In order to pick up the package and deliver the package to the sorting facility, courier 124 must know the location of the package. As such, the set of components associated with the first transit state may include the street address and zip code of sender 128A.

At a second node in the transit route, "Pick-Up Address/Origin Facility," courier 124 may pick up the package and deliver the package to an origin sorting facility. The second node may be associated with a second transit state, "Pick-Up/Origin Sorting." In order to determine whether the package is intended for a remote destination or local destination, courier 124 must know a general destination of the package. As such, the set of components associated with the second transit state may include the zip code of recipient 128B. If the zip code is local, the transit state may change to "Destination Sorting," explained further below, because the package will not be routed to another facility prior to delivery. If the zip code is remote, courier 124 may advance the package to one or more intermediate facilities in order to reach the remote zip code for delivery.

At a third node in the transit route, "Intermediate Facility" (i.e., "In Transit"), courier 124 may further sort the package through one or more facilities, such as a centralized hub. The third node may be associated with a third transit state, "Intermediate Sorting." To continue advancing the package to a destination facility, courier 124 may continue to use the zip code of recipient 128B.

At a fourth node in the transit route, "Destination Facility," courier 124 may do a final sort to load the package on to the correct delivery vehicle. The fourth node may be associated with a fourth transit state, "Destination Sorting." To load the package onto the correct delivery vehicle, courier 124 may use a street address and a zip code. For example, the destination facility may be associated with a plurality of zip codes, while the delivery vehicle may be associated with a particular region of a single zip code, such that both a zip code and a street address further specifying the region of the zip code may be used.

At a fifth node in the transit route, "Delivery Vehicle," courier 124 may begin transport of the package to a recipient's destination. The fifth node may be associated with a fifth transit state, "Delivery Transit." To deliver the package to the correct address, courier 124 must know a street address of recipient 128B. As such, the set of components may include the street number and street name of recipient 128B.

At a sixth node in the transit route, "Recipient Residence," courier 124 may advance the package to a particular unit at the recipient address. The sixth node may be associated with a sixth transit state, "Delivery." For residences that do not include multiple units, the fifth and sixth transit states may be a combined transit state having a combined set of components (e.g., name, street number, street name). To deliver the package to the residence, courier 124 may use a name, unit number, street number, and street name of recipient 128B.

At a seventh node in the transit route, "Recipient," courier 124 may deliver the package to recipient 128B. The seventh node may be associated with a seventh transit state, "Delivered." In some examples, courier 124 may print out a label that includes a name and unit number of recipient 128B, such that the package may be identified as belonging to recipient 128B. In this way, courier 124 may use the set of components received from administrator 116 to deliver the package to recipient 128B.

While not shown, the transit state may change to an eighth transit state, "Return," if recipient 128B initiates a return. For example, for a return, sender 128A may send a request for destination information with an indication of a "return" transit state. In such an instance, recipient 128B may become a sender and sender 128A may become a recipient, such that the transit states may be generally reversed.

As another example, the transit state may change to a ninth transit, "Exception," if a mistake occurs. An exception may represent departure or arrival of the package at a node outside a transit route of the package or at a time outside a projected or allowed transit time for the package. For example, administrator computer 108 may determine an exception based on a request for destination information from a location significantly outside a projected transit route of the package. For an exception, administrator computer 108 may provide more address information to remote courier computer 120 and/or request addition information from remote courier computer 120. For example, administrator computer 108 may send remote courier computer 120 previous node information to place the package back on the transit route. As another example, administrator computer 108 may expedite shipping or change the transit route, such as by prioritizing the package to an air route from a ground route.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device, a first request for destination information for a package, wherein the first request includes a package identifier (ID) of the package and a scanner ID of a first scanner;
determining, by the computing device, a first transit state of the package based on the scanner ID;
determining, by the computing device, a first set of components of a destination delivery address of the package based on the package ID and the first transit state of the package, wherein the first transit state is associated with a first node in a transit route of the package to the destination delivery address;
in response to a verification of the first scanner based on the first scanner ID, sending, by the computing device and to the first scanner, the first set of components of the destination delivery address;
receiving, by the computing device, a second request for destination information for the package, wherein the second request includes the package ID;
determining, by the computing device, a second set of components of the destination delivery address of the package based on the package ID and a second transit state of the package, wherein the second transit state is associated with a second node in the transit route of the package to the destination delivery address, and wherein the second set of components is different from the first set of components; and
sending, by the computing device and to a device associated with the second node, the second set of components of the destination delivery address.

2. The method of claim 1, wherein each of the first and second sets of components of the destination delivery address includes one or more of a zip code, a state, a city, a street address, a house number, an apartment number, a county, province, a country, a descriptive address, a PO Box, an APO, FPO or MPO address, a first name, a last name, a phone number, or an email address, twitter handle, or other electronic communications identifier.

3. The method of claim 1, wherein each of the first and second transit states comprises at least one of origin sorting, transit, destination sorting, delivery, or exception.

4. The method of claim 1, further comprising:
receiving, by the computing device, the destination delivery address for the package; and
generating, by the computing device, a plurality of sets of components of the destination delivery address from components of the destination delivery address, wherein each set of components of the plurality of sets of components is associated with a transit state of a plurality of transit states for the transit route.

5. The method of claim 4, wherein the transit route includes a plurality of nodes in a linear arrangement, and wherein each node is associated with a transit state of the plurality of transit states.

6. The method of claim 5, wherein each of the first and second sets of components represents information for advancing the package to a next node in the linear arrangement.

7. The method of claim 1, wherein each of the first and second requests for destination information includes the respective first or second transit state of the package.

8. The method of claim 1, wherein the first request for destination information includes first location information of the first scanner and the second request for destination information includes second location information of a second scanner, different from the first location information, and wherein the method further comprises:
determining, by the computing device, the first transit state of the package based on the package ID, the scanner ID, and the first location information; and
determining, by the computing device, the second transit state of the package based on the package ID and the second location information.

9. The method of claim 1, wherein determining the first transit state of the package based on the scanner ID further comprises:
determining, by the computing device, a location of the package based on the scanner ID; and
determining, by the computing device, the first transit state of the package based on the location of the package.

10. A computing device comprising:
a memory; and
one or more processors in communication with the memory and configured to:
receive a first request for destination information for a package, wherein the first request includes a package identifier (ID) of the package and a scanner ID of a first scanner;
determine a first transit state of the package based on the scanner ID,
determine a first set of components of a destination delivery address of the package based on the package ID and the first transit state of the package, wherein the first transit state is associated with a first node in a transit route of the package to the destination delivery address;
in response to a verification of the first scanner based on the first scanner ID, send, to the first scanner, the first set of components of the destination delivery address;
receive a second request for destination information for the package, wherein the second request includes the package ID;
determine a second set of components of the destination delivery address of the package based on the package ID and a second transit state of the package, wherein the second transit state is associated with a second node in the transit route of the package, and wherein the second set of components is different from the first set of components; and
send, to a device associated with the second node, the second set of components of the destination delivery address.

11. The computing device of claim 10, wherein each of the first and second sets of components of the destination delivery address includes one or more of a zip code, a state, a city, a street address, a house number, an apartment number, a county, province, a country, a descriptive address, a PO Box, an APO, FPO or MPO address, a first name, a last name, a phone number, or an email address, twitter handle, or other electronic communications identifier.

12. The computing device of claim 10, wherein each of the first and second transit states comprises at least one of origin sorting, transit, destination sorting, delivery, or exception.

13. The computing device of claim 10, wherein the one or more processors are further configured to:
receive the destination delivery address for the package; and
generate a plurality of sets of components of the destination delivery address from components of the destination delivery address, wherein each set of components of the plurality of sets of components is associated with a transit state of a plurality of transit states for the transit route.

14. The computing device of claim 13, wherein the transit route includes a plurality of nodes in a linear arrangement, and wherein each node is associated with a transit state of the plurality of transit states.

15. The computing device of claim 14, wherein each of the first and second sets of components represents information for advancing the package to the next node in the linear arrangement.

16. The computing device of claim 10, wherein each of the first and second requests for destination information includes the respective first or second transit state of the package.

17. The computing device of claim 10, wherein the first request for destination information includes first location information of the first scanner and the second request for destination information includes second location information of a second scanner, different from the first location information, and wherein the one or more processors are further configured to:
determine the first transit state of the package based on the package ID, the scanner ID, and the first location information; and
determine the second transit state of the package based on the package ID and the second location information.

18. The computing device of claim 10, wherein, to determine the first transit state of the package, the one or more processors are further configured to:

determine a location of the package based on the scanner ID; and determine the first transit state of the package based on the location of the package.

19. A non-transitory computer-readable storage medium having stored thereon instructions that, when executed, cause one or more processors of a computing device to:

receive a first request for destination information for a package, wherein the first request includes a package identifier (ID) of the package and a scanner ID of a first scanner;

determine a first transit state of the package based on the scanner ID;

determine a first set of components of a destination delivery address of the package based on the package ID and a first transit state of the package, wherein the first transit state is associated with a first node in a transit route of the package to the destination delivery address;

in response to a verification of the first scanner based on the first scanner ID, send, to the first scanner, the first set of components of the destination delivery address;

receive a second request for destination information for the package, wherein the second request includes the package ID;

determine a second set of components of the destination delivery address of the package based on the package ID and a second transit state of the package, wherein the second transit state is associated with a second node in the transit route of the package, and wherein the second set of components is different from the first set of components; and send, to a device associated with the second node, the second set of components of the destination delivery address.

* * * * *